United States Patent [19]

Dahm et al.

[11] 3,714,080

[45] Jan. 30, 1973

[54] POLYURETHANE FOAM RESIN STABILIZERS

[75] Inventors: Manfred Dahm, Bergisch-Neukirchen; Karl-Josef Kraft, Leverkusen; Manfred Roegler, Bad Godesberg, all of Germany

[73] Assignee: Farbenfabriken Bayer Aktiengasellschaft, Leverkusen, Germany

[22] Filed: June 9, 1971

[21] Appl. No.: 151,519

[30] Foreign Application Priority Data

June 13, 1970 Germany ............... P 20 29 293.7

[52] U.S. Cl. ............................................. 260/2.5 AH
[51] Int. Cl. ............................................. C08g 22/44
[58] Field of Search ............................... 260/2.5 AH

[56] References Cited

UNITED STATES PATENTS

| 3,658,864 | 4/1972 | Golitz | 260/46.5 G |
|---|---|---|---|
| 3,541,031 | 11/1970 | Boudreau | 260/2.5 AH |
| 3,483,240 | 12/1969 | Boudreau | 260/2.5 AH |
| 3,478,075 | 11/1969 | Jack | 260/2.5 AH |
| 3,567,753 | 3/1971 | Delaval | 260/2.5 AH |
| 3,518,288 | 6/1970 | Haluska | 260/2.5 AH |
| 3,471,588 | 10/1969 | Kanner | 260/2.5 AH |
| 3,404,168 | 10/1968 | Simmler | 260/2.5 AH |
| 3,278,485 | 10/1966 | Morgan | 260/2.5 AH |
| 3,246,048 | 4/1966 | Haluska | 260/2.5 AH |

FOREIGN PATENTS OR APPLICATIONS

| 1,016,663 | 1/1966 | Great Britain | 260/2.5 AH |
| 1,905,101 | 8/1970 | Germany | 260/2.5 AH |

*Primary Examiner*— Donald E. Czaja
*Assistant Examiner*— C. Warren Ivy
*Attorney*— Robert A. Gerlach and Sylvia Gosztony

[57] ABSTRACT

Polyurethane foam resins having improved physical properties are produced by incorporating in the reaction mixture a siloxane modified carbamic acid derivative foam stabilizer having at least one structural unit of the formula

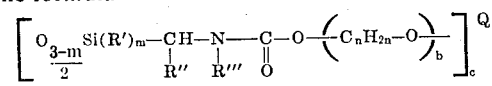

and other structural units of the formula

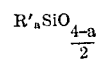

but in which at least one in a thousand structural units corresponds to the first mentioned formula, and R' represents an optionally halogenated or cyano-substituted $C_1$ to $C_{10}$ alkyl, $C_4$ to $C_{10}$ cycloalkyl or $C_6$ to $C_{10}$ aryl radical, R'' represents a hydrogen atom of a methyl or phenyl radical, R''' represents a $C_1$ to $C_{10}$ alkyl, $C_4$ to $C_{10}$ cycloalkyl, $C_2$ to $C_{10}$ alkenyl, $C_7$ to $C_{10}$ aralkyl, di-($C_1$ — $C_{10}$ alkyl)-amino—$C_1$—$C_{10}$ alkyl, $C_6$ to $C_{10}$ aryl or $C_7$ to $C_{10}$ alkaryl radical, Q represents a monovalent to hexavalent saturated $C_1$ to $C_6$ alkyl radical, or a monovalent to trivalent $C_6$ aryl radical, $m = 0$, 1 or 2, $n = 2$, 3 or 4, $a = 0$, 1, 2 or 3, $b$ represents an integer of 1 to 200, and $c$ represents the valency of Q, the radicals and numerical values at each position of a molecule being chosen independently of the others.

9 Claims, No Drawings

POLYURETHANE FOAM RESIN STABILIZERS

Foam resins with a very wide variety of physical properties have been produced for a long time on a technical scale by the isocyanate polyaddition process from compounds which contain several active hydrogen atoms, in particular compounds which contain hydroxyl and/or carboxyl groups, and polyisocyanates with the addition of water, activators, emulsifiers, foam stabilizers and other additives (R. Vieweg, A. Hochtlen, Kunststoff-Handbuch. Volume VII, Polyurethane, Publishers C. Hanser-Verlag, Munich, 1966). With suitable choice of components, this process can be used for producing both elastic and rigid foams or foams having properties intermediate between these extremes.

Foam resins derived from polyisocyanates are preferably produced by mixing liquid components. The starting materials which have to be reacted together are either all mixed together at the same time or a prepolymer containing NCO groups is first prepared from a polyhydroxyl compound such as polyalkylene glycol ethers or polyesters which contain hydroxyl groups and an excess of polyisocyanate, and this prepolymer is then converted into the foam resin in a second stage with water.

The foam stabilizers used are additives which are intended to prevent "overcooking" of the foam during expansion and consequently to prevent escape of the gas evolved which blows up the foam or to prevent collapse of the foam after the maximum volumetric expansion has been reached. Another of the various effects of the foam stabilizers is to lower the surface tension of the foamable mixture and at the same time to increase its viscous elasticity.

Co-condensation products of dimethylpolysiloxanes with polyglycols are already known as foam stabilizers; in these compounds, the polysiloxane residue is linked to the polyglycol residue both by Si—O—C bridges and by Si—C— bridges. Compounds of the former class, which belong to the type of (organo)silicic acid esters, are easily hydrolyzed, and this ease of hydrolysis is further promoted by the solubility in water of the compounds themselves and of one of the hydrolysis products. This factor is a serious disadvantage for the production of foam resins on a large technical scale. The reason for this is that since the quantities of water, and especially of catalyst and foam stabilizer, is small compared with the other components required for foaming, these components are not always fed separately into the mixing chamber of the foaming machine but often in the form of a solution or emulsion of water, catalyst and foam stabilizer in order that the proportions will be accurately maintained. Moreover, for the production of hard polyurethane foams frequently for technical reasons the foam stabilizers are dissolved in the polyols together with the catalysts, water and/or other blowing agents or other additives and the resulting mixture is then mixed with the necessary quantity of polyisocyanate to bring about foam formation. In none of these cases is it possible to avoid prolonged contact of the hydrolyzable silicic acid ester with water or a mixture of water and amine. This is a serious disadvantage because the polymethyl polysiloxane produced on hydrolysis is not only ineffective as a foam stabilizer but also inactivates the unhydrolyzed foam stabilizer to such an extent that one either obtains foams which have coarse, irregular pores or the foam collapses.

Condensation products of dimethylpolysiloxanes with polyglycols which contain Si—C linkages do not have these disadvantages; they are substantially stable in aqueous solution and in solutions of amine and water.

Owing to their physico-chemical effect, foam stabilizers also influence the pore structure of the foams. The structure should be very finely cellular in order that the density may be homogeneously distributed over the whole cross-section of the block and optimum physical properties may be obtained. In addition, the foam stabilizers must be capable of stabilizing foams obtained from a very wide variety of polyols, the variety covering both a wide range of molecular weights and a wide range of chemical structures. A wide spectrum foam stabilizer should be equally effective for hard foam polyethers based on sucrose or trimethylol propane and for soft foam polyethers. Furthermore, the foam stabilizer should provide a high yield of blowing agent and ensure efficient flow of the foamable mixture, especially in cases where the foam resins are to be moulded, in order that the foam may fill up all the space available to it. Lastly, the foam stabilizer should enable foam resins with optimal mechanical properties to be produced and should yield, for example, soft polyurethane foams with maximum hardness, and for the reasons already mentioned above it should be resistant to hydrolysis.

Experiments have shown, and further evidence is provided below, that none of the foam stabilizers previously known has fulfilled all these practical requirements of a foam stabilizer.

It has now surprisingly been found that these requirements for the production of foam resins which contain urethane groups from polyhydroxyl compounds, polyisocyanates and water or other blowing agents in the presence of foam stabilizers are fulfilled to a very large extent if siloxane-modified carbamic acid derivatives are used as foam stabilizers.

The present invention therefore relates to a process for the production of foam resins which contain urethane groups from polyhydroxyl compounds, polyisocyanates, water and/or other blowing agents, foam stabilizers and other additives, which process is characterized in that the foam stabilizers used are siloxane-modified carbamic acid derivatives which consist of at least one structural unit of the formula:

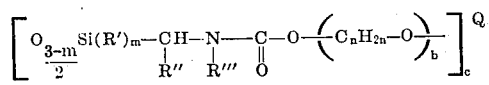

and other structural units of the formula:

but in which at least one in a thousand structural units consists of the first mentioned formula, and in which R′ represents an optionally halo-substituted or cyano-substituted $C_1$ to $C_{10}$ alkyl, $C_4$ to $C_{10}$ cycloalkyl, or $C_6$ to $C_{10}$ aryl radical, R'' represents a hydrogen atom or a methyl or phenyl radical, R''' represents a $C_1$ to $C_{10}$ alkyl, $C_4$ to $C_{10}$ cycloalkyl, $C_2$ to $C_{10}$ alkenyl, $C_7$ to $C_{10}$ aralkyl, di-($C_1$—$C_{10}$ alkyl)—amino, $C_1$ to $C_{10}$ alkyl, $C_6$ to $C_{10}$ aryl or $C_7$ to $C_{10}$ alkaryl radical, Q represents a monovalent to hexavalent saturated $C_1$ to $C_6$ alkyl radical or a monovalent to trivalent $C_6$ aryl radical, $m = 0, 1$ or $2$, $n = 2, 3$ or $4$, $a = 0, 1, 2$ or $3$, $b =$ an integer from 1 to 200, $c =$ the valency of Q, the radicals and numerical values at each point of a molecule being chosen independently of the others.

The following compounds are examples of suitable siloxane-modified carbamic acid derivatives for use according to the invention:

I. 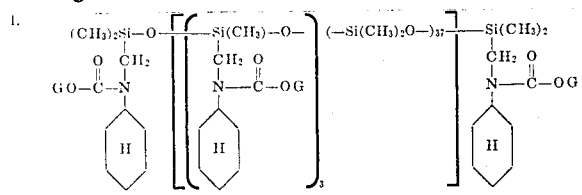

wherein —OG represents the radical:

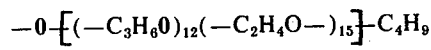

of a block polyether.

II. 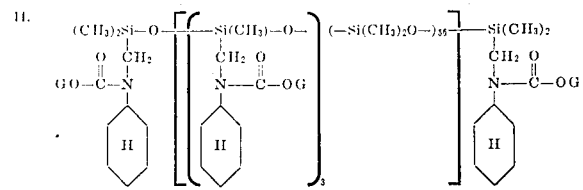

wherein —OG represents the radical:

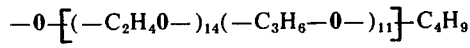

of a mixed polyether.

IIIa) 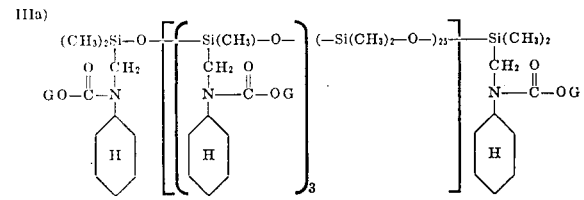

wherein —OG represents the radical:

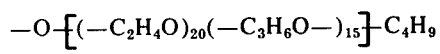

of a block polyether.

III (b) The same as III (a) but —OG represents the radical:

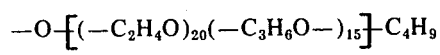

of a mixed polyether.

IVa) 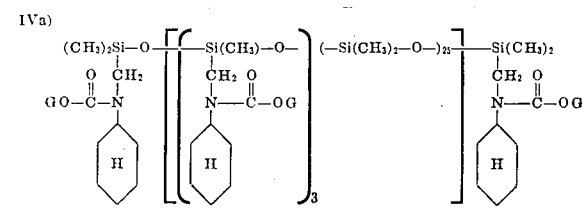

wherein —OG represents the radical:

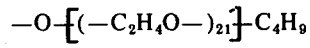

of a polyether.

IV (b) The same as IV (a), but —OG represents the radical:

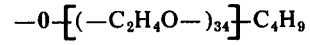

of a polyether.

V 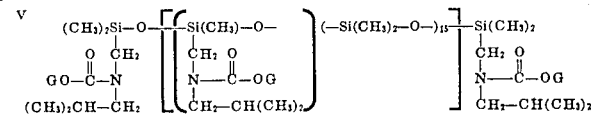

wherein —OG represents the radical:

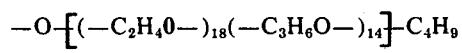

of a polyether.

The stabilizers for use according to the invention may be prepared according to the instructions given in U.S. Pat. No. 3,658,864 according to which e.g., an aminomethyl-substituted polysiloxane which consists of at least one structural unit of the formula:

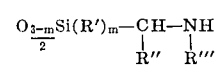

in which R', R'', R''', and m have the meanings already indicated, and of other structural units of which, independently of the others, corresponds either to the above mentioned formula or to the formula:

in which R' and a have the meanings already indicated, with a chloroformic acid ester of the formula:

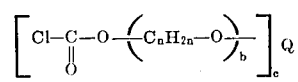

in which Q, n, b and c have the meanings already indicated, the reaction being carried out in the presence of a tertiary amine at a temperature of between 20° C and 150° C, optionally in the presence of an inert solvent.

These silicon compounds may be added to the foamable reaction mixtures in various amounts according to their reactivity. Quantities of 0.05 to 5 percent and preferably 0.1 to 3 percent, based on the quantity of polyhydroxyl compounds, will usually be employed.

The siloxane-modified carbamic acid derivatives for use according to the invention may be incorporated with any of the reactants during foaming, e.g., the polyol or the organic polyisocyanate, or they may be used e.g., in the form of an aqueous solution together with the amine catalyst. Alternatively, part or all of these silicon compounds may be added separately to the foamable mixture or they may be mixed with so-called formulations including one or more polyols, blowing agents, catalysts or other additives.

Any polyisocyanates may be used for the process according to the invention, e.g., hexamethylene diisocyanate, xylylene diisocyanates, phenylene diisocyanates, toluylene diisocyanates, chlorophenylene diisocyanates, diphenylmethane-4,4'-diisocyanate, naphthylene-1,5-diisocyanate, triphenylmethane-4,4',4''α,α'-diisothiocyanate.

Other suitable polyisocyanates include dimers and trimers of isocyanates and diisocyanates, biuret polyisocyanates, semicarbazide-, urea-, allophanate- or acylated biuret-polyisocyanates or adducts of polyisocyanates and alcohols, which adducts have free NCO groups, e.g., adducts obtained with alcohols such as trimethylol propane, glycerol, hexane-1,2,6-triol or glycol or adducts obtained with low molecular weight polyesters such as castor oil, or reaction products of the above isocyanates with acetals according to German Pat. Specification No. 1,072,385 and the isocyanates mentioned in German Pat. Specification Nos. 1,022,789 and 1,027,394; any mixture of the above mentioned compounds, of course, may be used. It is especially advantageous to use 2,4- and 2,6-toluylene diisocyanate or any mixture of these isomers and polyphenyl-polymethylene-polyisocyanates obtained by aniline formaldehyde condensation followed by phosgenation.

Any organic compounds having at least two active hydrogen atoms may be used for the process according to the invention; they generally have a molecular weight of about 250 to about 10,000. Polyhydroxy polyethers and polyhydroxy polyesters are preferred.

Suitable polyhydroxy polyethers are especially those in the molecular weight range of 250 to 5000. These compounds are advantageously prepared by reacting alkylene oxides or alkylene oxide mixtures with suitable initiator molecules. The alkylene oxides which are preferably used are ethylene oxide, propylene oxide, 1,2-butylene oxide, 2,3-butylene oxide and 1,4-butylene oxide. Suitable initiator molecules are any compounds, preferably low molecular weight compounds, which contain at least two active hydrogen atoms, e.g., water, ethylene glycol, 1,2- and 1,3-propane diol, glycerol, trimethylol propane, 1,2,6-hexane triol, pentaerythritol, sorbitol, cane sugar, polyhydroxybenzenes, polyhydroxy naphthalenes, polyhydroxy anthracenes, poly-(hydroxyaryl)-alkanes and addition products of alkylene oxides with phenol resins which have hydroxyl groups, e.g. phenol resins such as Novolaks and similar compounds. Other initiator molecules which are also suitable for the reaction with alkylene oxides are primary diamines and polyamines, e.g., ethylene diamine, propylene-1,3-diamine, butylene-1,4-diamine, diaminobenzenes, triaminobenzenes and secondary diamines and polyamines such as N,N'-dimethyl-ethylene diamine, N,N'-dimethyl-propylene diamine, N,N'-dimethyl-diaminobenzenes, N,N',N''-trimethyl-triaminobenzenes and similar compounds. The polyhydroxy polyethers may also be used in admixture with the monomeric organic initiator molecules.

Polyhydroxy polyesters suitable for the process according to the invention are especially those which have a hydroxyl equivalent weight of 100 to 3000, the hydroxyl equivalent weight being the quantity of polyester in grams which contains 1 mol of hydroxyl groups. The polyhydroxy polyesters are prepared by reacting polycarboxylic acids or their anhydrides with polyhydric hydroxyl compounds. Suitable polycarboxylic acids are e.g., oxalic acid, succinic acid, glutaric acid, adipic acid, pimelic acid, maleic acid, fumaric acid, phthalic acid, terephthalic acid and dimerized fatty acids. Suitable polyvalent polyhydroxyl compounds are e.g., ethylene glycol, diethylene glycol, triethylene glycol, polyethylene glycols, propylene glycol, dipropylene glycol, polypropylene glycols, butane-1,4-diol, butene-(2)-diol-(1,4), glycerol, trimethylol propane, pentaerythritol, castor oil, hydroquinone, 4,4'-dihydroxy-diphenylmethane and triethylene glycol, polyethylene glycols, propylene glycol, dipropylene glycol, polypropylene glycols, butane-1,4-diol, butene-(2)-diol-(1,4), glycerol, trimethylol propane, pentaerythritol, castor oil, hydroquinone, 4,4'-dihydroxy-diphenylmethane and 4,4-dihydroxy-diphenylpropane. The polyhydroxy polyesters are preferably prepared by reacting dicarboxylic acids with divalent hydroxyl compounds. Tricarboxylic acids or polycarboxylic acids as well as polyhydroxyl compounds of higher valency may also be added in the preparation of the polyhydroxyl polyesters.

The quantity of tertiary amine which may be used, if desired, in the foam production according to the invention generally varies between about 0.001 and 10 percent by weight, based on the quantity of polyol, and depends on the molecular weight and the structure of the polyol component, of the amine and of the isocyanate. The tertiary amines may, if desired, contain active hydrogen atoms.

Typical tertiary amines which are practically unreactive with isocyanate groups include triethylamine, tributylamine, N-methyl morpholine, N-ethyl morpholine, N-coco morpholines, N,N,N',N'-tetramethylethylene diamine, 1,4-diaza-bicyclo-(2,2,2)-octane, N-methyl-N'-dimethyl-amino-ethyl piperazine, bis-[2-(N,N-dimethylamino)-ethyl] ether, N,N-dimethylbenzylamine, bis-(N,N-dimethylaminoethyl) adipate, N,N-diethyl-benzylamine, pentamethyl diethylene triamine, N,N-dimethylcyclohexylamine, N,N,N',N'-tetramethyl-1,3-butane-diamine, N,N-dimethyl-β-phenylethylamine, 1,2-dimethyl imidazole, 2-methyl imidazole and silaamines which have carbon-silicon bonds, e.g., those described in German Pat. Specification No. 1,229,290; the following are mentioned as examples: 2,2,4-trimethyl-2-silamorpholine, 1,3-diethylaminomethyl-tetramethyl-disiloxane.

Typical tertiary amines which contain active hydrogen atoms that are reactive with isocyanate groups are e.g., triethanolamine, triisopropanolamine, N-methyl diethanol-amine, N-ethyl diethanolamine, dimethyl ethanolamine and reaction products of the aforesaid compounds with alkylene oxides such as propylene oxide and/or ethylene oxide.

Instead of using amines as catalysts, one may also use bases which contain nitrogen, such as tetraalkyl ammonium hydroxides, or alkalis, alkali metal phenolates or alcoholates, e.g., sodium methylate, or hexahydrotriazines.

Organic metal compounds, especially organic tin compounds, may be used as additional catalysts for accelerating the reaction between isocyanate and polyol, especially for accelerating the reaction between polyether polyol and isocyanate.

Tin compounds which should be especially mentioned are the stannoacylates such as tin (II) octoate, tin (II) ethylhexoate, tin (II) versatate, tin (II) acetate and tin (II) laurate or the dialkyl tin salts of carboxylic acids, e.g., dibutyl tin diacetate, dibutyl tin dilaurate, dibutyl tin maleate or dioctyl tin diacetate.

The blowing agents used are water or liquefied halogenated carbon compounds, separately or in combination with each other. The liquefied halogenated carbon compounds are saturated, aliphatic, at least partly halogenated hydrocarbons which evaporate at or below the temperature of foam formation. Preferred compounds are water and halogenated hydrocarbons such as methylene chloride, chloroform, trichlorofluoromethane, dichlorofluoromethane, etc. Additives for regulating the pore size and cell structure or emulsifiers may also be used in small quantities although their presence is in some cases not necessary. Fillers may also be present during production of the foams in the same way as dyes or plasticizers.

The polyurethane foams may be produced by the known one-step, semi-prepolymer or prepolymer processes at room temperature or at elevated temperature. Mechanical devices are advantageously used for this purpose, e.g., those described in French Pat. Specification No. 1,074,712.

The foam resins produced by the process according to the invention are suitable for any purposes for which polyurethane foams have previously been used, e.g., for the production of cushion elements, heat insulation, sound insulation, textile coating, packaging and the production of structural elements.

The process according to the invention will now be described in more detail with the aid of the following examples.

The foam stabilizers mentioned in the examples are the following products.

A. Products of the following constitution for use according to the invention:

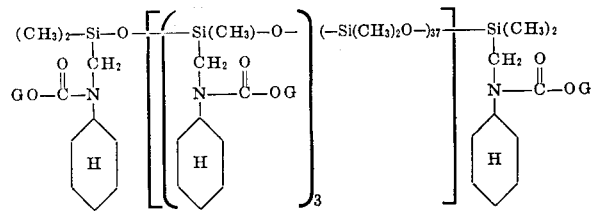

in which —OG denotes the radical:

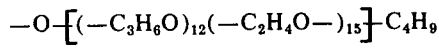

of a block polyether.

Preparation of Compound A:

1. A mixture of 249 g (1.2 mol) of bromomethyl-methyl-dichlorosilane, 1900 g (14.75 mol) of dimethyl-dichloro-silane and 149.5 g (0.798 mol) of bromomethyl-dimethyl-chlorosilane is hydrolyzed by adding it dropwise to 5000 ml of water. After addition of this mixture has been completed, the reaction mixture is stirred for ½ hour and the phases are separated at 20° C. The organic phase is dehydrated by boiling it out and passing nitrogen through, using a water separator. 3 percent of Fuller's earth are then added and more water is separated in a stream of nitrogen at 100° C to 150° C. The mixture is equilibrated at 150° C for 5 hours, cooled, and filtered over filtering agents at room temperature. A clear oil is obtained which has a refractive index of $n_{20}^{D}=1.4189$, a viscosity of 60.9 centipoise at 20° C and a bromine content of 11.2 percent. (Yield: 88.9 percent of the theory).

2. 1215 g of this oil are added dropwise to 1300 g (13.2 mol) of cyclohexylamine at 100° C. The reaction mixture is then stirred for one hour at 100° C and cooled to room temperature, and the salt which is formed is filtered off. The filtrate is heated to a maximum temperature of 100° C in a vacuum (15 mm Hg) with stirring and then treated in a thin layer evaporator at 130° C and 0.5 mm Hg. The product is filtered over filtering agents at 20° C. The clear oil (yield: 85.1 percent of the theory) has a refractive index of 1.4250 and a viscosity of 123.5 centipoise at 20° C.

| Analysis: | Total nitrogen | 1.89 % |
| | basic nitrogen | 1.92 % |
| | primary nitrogen | 0 % |
| | secondary nitrogen | 1.81 % |
| | tertiary nitrogen | 0.11 % |

3. 954 g (1.22 gram equivalents) of the aminomethyl-polysiloxane prepared under (2) are dehydrated with 3100 g of toluene under reflux, using a water separator. 135 g (1.35 mol) of dehydrated triethylamine are added to the dehydrated solution. To this mixture are added 1.35 gram equivalents of a reaction product of phosgene with a block polyether having the following average composition:

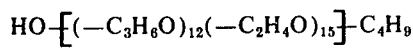

and the reaction mixture is boiled under reflux for 3 hours. It is then cooled to 60° C and the excess chloroformic acid ester is reacted with cyclohexylamine and then stirred for another hour. After cooling to room temperature, the reaction product is filtered and the filtrate is heated in a stream of nitrogen in a water jet vacuum to a maximum temperature of 130° C. The filtrate is then filtered once more through a suction filter under pressure at room temperature. The filtrate dissolves in water to form a clear solution. Yield: 95.5 percent of the theory. The product obtained contains 28 percent of $(CH_3)_2SiO$ groups and has a viscosity of 2160 centipoise at 25° C.

B. Product to be used according to the invention having the same constitution as A but in which —OG represents the radical:

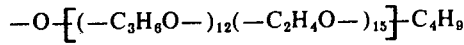

of a mixed polyether of ethylene oxide and propylene oxide.

Preparation of Compound B:

954 g (1.22 gram equivalents of the aminomethyl polysiloxane prepared under A2) are reacted in the same way as described in A3) with 1.35 gram equivalents of a reaction product of phosgene and a mixed polyether of ethylene oxide and propylene oxide of the formula:

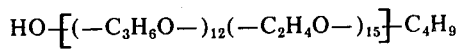

The clear oil obtained has a viscosity of 1425 centipoise at 20°C and contains 26.4 percent of $(CH_3)_2SiO$ groups.

C. Commercial product having the following constitution:

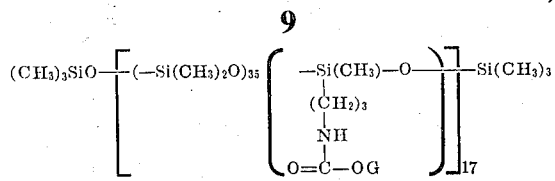

in which —OG denotes the radical:

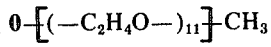

of a polyether based on ethylene oxide.

D. Foam stabilizer of T. Goldschmidt marketed as B 1400.

E. Foam stabilizer of T. Goldschmidt marketed as B 2219.

F. Foam stabilizer of Union Carbide Corporation, marketed as L 520.

G. Foam stabilizer of Dow Corning marketed as DC 195.

H. Foam stabilizer of General Electric Co. marketed as SF 1141.

EXAMPLE 1

100 Parts by weight of a propylene oxide polyether which has been initiated on a mixture of sucrose, trimethylol propane and water and which has a hydroxyl number of 380 and a viscosity of 10,000 centipoise at 25° C, 4 parts by weight of N-methyl-N'-dimethyl-aminoethyl-piperazine, 1.0 part by weight of the foam stabilizers A to H described above, 50 parts by weight of trichloro-fluoromethane and 92 parts by weight of polymeric diphenyl-methane-4,4'-diisocyanate are mixed in a high pressure nozzle machine and the mixture is introduced a) into a paper mould having a base measuring 12.5 × 25 cm, and b) always under the same conditions into an L-shaped mould (height of the vertical part 100 cm, length of the horizontal part 30 cm, width of the mould 30 cm, width of the cavity 2.5 cm), and foam formation takes place in these moulds. In the case of the paper mould, the foam resins obtained are assessed for their unit weight, compression strength, size of cells and cell structure and in the case of the L-shaped mould they are assessed according to the quantity introduced, the flow height, the average unit weight and disturbances in flow. These data provide a total assessment of the foam stabilizer. The results obtained are summarized in Table 1. In this case, as also in other examples, the assessment of cell size and cell structure and the total assessment are made according to the following classification:

Cell Size:
  Grade 1 = very fine (spherical)
  2 = fine
  3 = moderately fine
  4 = coarse
  5 = very coarse
Cell Structure:
  Grade 1 = very regular
  2 = regular
  3 = slight defects
  4 = irregular
Total Assessment:
  Grade 1 = very good
  2 = good
  3 = satisfactory to adequate
  4 = unsatisfactory.

The figures in Table 1 show the superiority of the foam stabilizers according to the invention.

EXAMPLE 2

The following are mixed together in a high pressure nozzle machine: 100 parts by weight of a propylene oxide polyether which has been initiated on a mixture of sorbitol and propylene glycol and has a hydroxyl number of 480 and a viscosity of 8000 centipoise at 25° C, 2.0 parts by weight of N-methyl-N'-dimethyl-aminoethyl piperazine, 1.0 part by weight of the foam stabilizers A to H described above, 50 parts by weight of trichlorofluoromethane and 127 parts by weight of polymeric diphenylmethane-4,4'-diisocyanate, and the mixture is introduced into the paper mould and L-shaped mould described in Example 1 and foam formation takes place. The results of these tests are summarized in Table 2 which again shows the superior qualities of the foam stabilizers according to the invention.

EXAMPLE 3

The following components are mixed together in a high pressure nozzle machine:
  40 parts by weight of a polyester of phthalic acid anhydride, adipic acid, oleic acid and trimethylol propane, hydroxyl number 370 and viscosity of 1400 centipoises at 75°C,
  30 parts by weight of a propylene oxide polyether which has been started with trimethylol propane and has a hydroxyl number of 550 and a viscosity of 2000 centipoise at 25° C,
  30 parts by weight of a propylene oxide polyether which has been started with trimethylol propane and has a hydroxyl number of 370 and a viscosity of 650 centipoise at 25° C,
  3 parts by weight of sodium castor oil sulphonate (50 parts by weight of water),
  0.5 part by weight of N-methyl-N'-dimethylaminoethyl piperazine,
  0.5 part by weight of a mixture of N-methyl-N'-dimethyl-aminoethyl piperazine and N,N',N''-pentamethyl diethylene triamine (proportion by weight 1:3),
  1.0 part by weight of foam stabilizers A to H as described above,
  40 parts by weight of trichlorofluoromethane, and
  130 parts by weight of polymeric diphenylmethane-4,4'-diisocyanate.

The homogeneous mixture is introduced into the paper mould and L-shaped mould as described in Example 1 and foam formation takes place in these moulds. The results of the comparison test are summarized in Table 3 which shows clearly the superiority of the foam stabilizers according to the invention.

EXAMPLE 4

The following components are mixed together in a high pressure nozzle machine:
  75 parts by weight of a propylene oxide polyether which has been initiated with sucrose and has a hydroxyl number of 380 and a viscosity of 10,000 centipoises at 25°C,
  15 parts by weight of a propylene oxide polyether which has been started with ethylene diamine and has a hydroxyl number of 470 and a viscosity of 5000 centipoises at 25°C,
  10 parts by weight of a propylene oxide polyether which has been started with trimethylol propane and has a hydroxyl number of 550 and a viscosity of 2000 centipoise at 25°C, 3.0 parts by weight of sodium caster oil sulphonate (50 percent by weight water),
2.0 parts by weight of N-methyl-N'-dimethylaminoethyl piperazine,
1.0 part by weight of foam stabilizers A, B, C, E, F and G, respectively, described above,
40 parts by weight of trichlorofluoromethane, and
125 parts by weight of polymeric diphenylmethane-4,4'-diisocyanate.

The homogeneous mixture is introduced into the paper mould and L-shaped mould described in Example 1, in which foam formation takes place.

The results of the experiment are summarized in Table 4 which clearly shows the superiority of the foam stabilizers according to the invention.

EXAMPLE 5

The following components are mixed together:
80 parts by weight of a propylene oxide polyether which has been started with trimethylol propane and has a hydroxyl number of 550 and a viscosity of 2000 centipoise at 25° C,
10 parts by weight of trimethylol propane,
10 parts by weight of a propylene oxide polyether which has been initiated on ethylene diamine and has a hydroxyl number of 470 and a viscosity of 5000 centipoise at 25° C,
20 parts by weight of trichloroethyl phosphate,
1.5 parts by weight of sodium castor oil sulphonate (50 percent by weight of water),
0.6 part by weight of triethylamine,
1.0 part by weight of foam stabilizers A to H described above,
40 parts by weight of trichlorofluoromethane, and
130 parts by weight of polymeric diphenylmethane-4,4'-diisocyanate.

The homogeneous mixture is introduced into the paper mould and L-shaped mould described in Example 1 and the hard polyurethane foams are formed in these moulds.

The results of the comparison test are summarized in Table 5 which shows the superiority of the foam stabilizers according to the invention.

EXAMPLE 6

The following components are mixed together in a high pressure nozzle machine:
75 parts by weight of a propylene oxide polyether which has been initiated on sucrose and which has a hydroxyl number of 380 and a viscosity of 10,000 centipoise at 25°C,
15 parts by weight of 0,0-diethyl-N,N-bis-(2-hydroxy-ethyl)-aminomethyl phosphonate,
10 parts by weight of castor oil,
1 part by weight of sodium castor oil sulphonate (50 percent by weight water),
2.0 parts by weight of ethoxylated benzyl-hydroxydiphenyl,
2.0 parts by weight of N-methyl-N'-dimethylaminoethyl piperazine,
1.0 part by weight of foam stabilizers A, C, E, F and G described above,
40 parts by weight of trichlorofluoromethane, and
105 parts by weight of polymeric diphenylmethane-4,4'-diisocyanate.

The homogeneous mixture is introduced into the paper mould and L-shaped mould described in Example 1, in which foam formation takes place. The results of the experiment, which are summarized in Table 6, clearly show the superiority of the foam stabilizers according to the invention.

EXAMPLE 7

A mixture of the following components is prepared:
75 parts by weight of a propylene oxide polyether which has been initiated on sucrose and which has a hydroxyl number of 380 and a viscosity of 10,000 centipoise at 25° C,
15 parts by weight of a propylene oxide polyether which has been initiated on ethylene diamine and has a hydroxyl number of 470 and a viscosity of 5000 centipoise at 25°C,
10 parts by weight of a propylene oxide polyether which has been initiated on trimethylol propane and has a hydroxyl number of 550 and a viscosity of 2000 centipoise at 25° C,
3.0 parts by weight of sodium castor oil sulphonate (50 percent by weight of water),
2.0 parts by weight of N-methyl-N'-dimethylaminoethyl piperazine, and
1.0 part by weight of foam stabilizers A, C and E, respectively, described above.

The mixtures are stored in a drying cupboard at 80°C. Samples are taken from the mixture before the experiments and after various lengths of storage time, and each sample is vigorously mixed with 40 parts by weight of trichlorofluoromethane and 125 parts by weight of polymeric diphenylmethane-4,4'-diisocyanate. Hard polyurethane foams are obtained. Their unit weight and setting time are determined and their cell size and cell structure assessed. These data are a measure of the stability of the foam stabilizers against degradation in an aqueous amine medium. The drop in foam stabilizing effect is particularly clearly recognizable by the increase in unit weight and increase in cell size. The results of the comparison test are summarized in Table 7 which shows clearly that the foam stabilizer according to the invention has remained unchanged even after 14 days' storage under the conditions indicated above, whereas foam stabilizers C and E have markedly deteriorated.

EXAMPLE 8

A mixture of the following components:
75 parts by weight of a propylene oxide polyether which has been initiated on sucrose and which has a hydroxyl number of 380 and a viscosity of 10,000 centipoise at 25°C,
15 parts by weight of 0,0-diethyl-N,N-bis-(2-hydroxyethyl)-aminoethyl phosphonate,
10 parts by weight of castor oil,
1 part by weight of sodium castor oil sulphonate (50 percent by weight of water),
2.0 parts by weight of ethoxylated benzyl hydroxydiphenyl
2.0 parts by weight of N-methyl-N'-dimethylaminoethyl piperazine, and
1.5 parts by weight of foam stabilizers A, C and D, respectively, described above, is stored in iron vats at room temperature for a period of 6 months, and at the start of the tests and at various intervals thereafter it is vigorously mixed with 40 parts by weight of trichlorofluoromethane and 105 parts by weight of polymeric diphenylmethane-4,4'-diisocyanate. The hard polyurethane foams obtained are assessed as described in Example 7 and the resistance of the foam stabilizers to hydrolysis is concluded from the results. The results summarized in Table 8 show the superiority of the foam stabilizers according to the invention.

EXAMPLE 9

In this example, the following foam stabilizers are compared with each other with respect to their effectiveness in the production of soft polyurethane foams:

I. Foam stabilizer according to the invention having the following constitution:

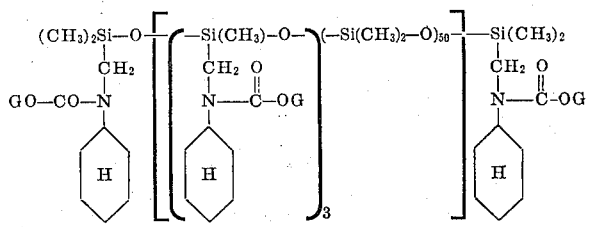

in which —OG denotes the radical:

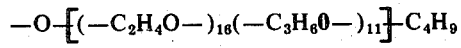

of a mixed polyether of ethylene oxide and propylene oxide.

This stabilizer was prepared as follows:

By a method analogous to that described in A 1), a clear silicone oil having a refractive index of 1.4158, a viscosity of 72.4 centipoise at 20° C and a bromine content of 8.3 percent is obtained in 90.6 percent yield by co-hydrolysis of 190 g (0.95 mol) of bromomethyldichlorosilane, 1980 g (15.3 mol) mol) dimethyldichlorosilane and 115 g (0.61 mol of bromomethyldimethylchlorosilane.

By a method analogous to that described in A 2), 1040 g (84.4 percent of the theory) of a clear aminomethyl-polysiloxane which has a refractive index of 1.4208, a viscosity of 144 centipoise at 20° C and a secondary nitrogen content of 1.47 percent are obtained from 1210 g of the above oil and 1100 g of cyclohexylamine.

By a method analogous to that described in A 3), a clear, water-soluble oil containing 35 percent of $(CH_3)_2SiO$ groups and having a viscosity of 1530 centipoise at 25° C is obtained from the above aminomethyl polysiloxane and the reaction product of phosgene and a mixed polyether of ethylene oxide and propylene oxide having the formula:

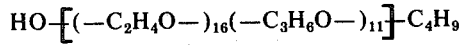

D. Foam stabilizer of T. Goldschmidt marketed as B 1400.

F. Foam stabilizer of Union Carbide Corporation marketed as L 520.

100 Parts by weight of a poly-propylene glycol which has been partly branched with trimethylol propane and modified with ethylene oxide and which has the hydroxyl number 49 (average molecular weight 3200), 2.7 parts by weight of water, 0.8 part by weight of foam stabilizers I, D and F, 0.005 part by weight of 2,2,4-trimethyl-2-silamorpholine, 0.06 part by weight of N-methyl-N'-dimethylaminoethyl piperazine, 0.2 part by weight of tin (II) octoate and 37.4 parts by weight of toluylene diisocyanate (80 percent 2,4- and 20 percent 2,6-isomer) are mixed together in the mixing chamber of a foaming apparatus, and the homogeneous mixture is delivered to the conveyor band of the apparatus, on which foam formation takes place. Foam resins which have the following physical properties are obtained.

| Foam Stabilizer: | I | D | F |
|---|---|---|---|
| Unit weight (kg/m³) DIN 53 420 | 38 | 38 | 37 |
| Tensile strength (kg wt/cm²) DIN 53 571 | 1.2 | 1.1 | 1.2 |
| Elongation at break (%) DIN 53 571 | 195 | 205 | 200 |
| Compression strength (p/cm²) (40% compression) DIN 53 577 | 58 | 46 | 47 |

The figures show that the foam stabilizers according to the invention give rise to foams which have greater hardness with otherwise equally good properties as foam stabilizers produced according to the state of the art.

EXAMPLE 10

100 Parts by weight of propylene oxide/polyethylene oxide/polyether which is based on trimethylol propane and hexane triol and has 67 percent of terminal primary OH groups and a hydroxyl number of 35 are thoroughly mixed with 0.2 part by weight of 1,4-diazabicyclo-(2,2,2)-octane, 3.5 parts by weight of water, 1.2 parts by weight of foam stabilizer A, 0.2 part by weight of tin (II) octoate and 42.5 parts by weight of toluylene diisocyanate (65 percent 2,4- and 35 percent 2,6-isomer, and the mixture is introduced into a mould in which foam formation takes place. A soft elastic foam resin which has good physical properties is obtained.

EXAMPLE 11

The following are introduced into the mixing chamber of a foaming apparatus:
  100 parts by weight of a poly-propylene glycol which has been partly branched with tri-methylol propane and modified with ethylene oxide and which has the hydroxyl number 49 (average molecular weight 3200),
  5.5 parts by weight of water,
  1.5 parts by weight of foam stabilizer B,
  0.008 part by weight of 2,2,4-trimethyl-2-silamorpholine,
  0.1 part by weight of N-methyl-N'-dimethylaminoethyl piperazine.
  0.25 part by weight of tin (II) octoate and
  65.9 parts by weight of toluylene diisocyanate (80 percent by weight of 2,4- and 20 percent by weight of 2,6-isomer).

The components are thoroughly stirred and delivered to the conveyor band. A soft elastic foam resin is obtained which has the following physical properties:

| | |
|---|---|
| Unit weight (kg/m³) DIN 53 420 | 20 |
| Tensile strength (kg wt/cm²) DIN 53 571 | 1.1 |
| Elongation at break (%) DIN 53 571 | 195 |
| Compression strength (p/cm²) (40% compression) DIN 53 577 | 34 |

EXAMPLE 12

100 Parts by weight of a polypropylene glycol which has been initiated with glycerol and modified with ethylene oxide and which has an average molecular weight of 3000 and a hydroxyl number of 56 are mixed with 50.0 parts by weight of toluylene diisocyanate (65 percent by weight 2,4- and 35 percent by weight 2,6-isomer), 4.0 parts by weight of water, 0.05 part by weight of 1,4-diaza-bicyclo-(2,2,2)-octane, 0.4 part by weight of tin (II) octoate and 1.5 parts by weight of a foam stabilizer according to the invention which has the following formula:

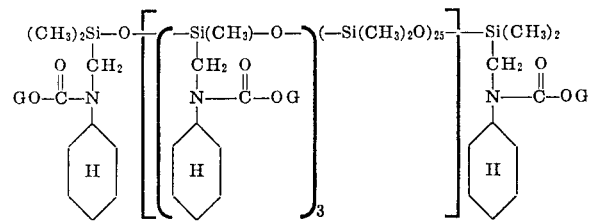

in which —OG denotes the radical:

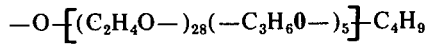

of a mixed polyether of ethylene oxide and propylene oxide. The soft elastic foam resin obtained has good physical properties.

EXAMPLE 13

The following components are thoroughly mixed together:

100 parts by weight of a slightly branched polyester which has been obtained by condensation of adipic acid with diethylene glycol and trimethylol propane (average molecular weight 2500, hydroxyl number 60), 40 parts by weight of toluylene diisocyanate (65 percent by weight of 2,4- and 35 percent of 2,6-isomer), 3.0 parts by weight of water, 1.1 parts by weight of N,N-dimethylbenzylamine, 0.5 part by weight of ethoxylated benzyl hydroxydiphenyl, 0.4 part by weight of ethoxylated hexahydrotriazine, 0.5 part by weight of a foam stabilizer according to the invention which has the following formula:

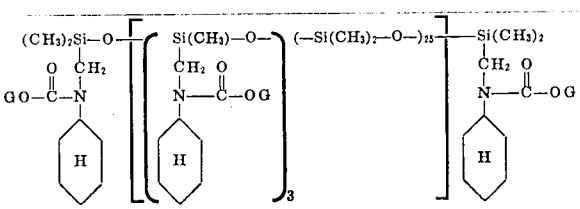

wherein —OG denotes the radical:

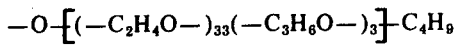

of a mixed polyether of ethylene oxide and propylene oxide.

The soft elastic polyester foam resin obtained has the following physical properties:

| | |
|---|---|
| Unit weight (kg/m³) DIN 53 420 | 39 |
| Tensile strength (kg wt/cm²) DIn 53 571 | 1.0 |
| Elongation at break (%) DIN 53 571 | 120 |
| Compression strength (p/cm²) (40% compression) DIN 53 577 | 74 |

TABLE 1

| Foam stabilizer | A | B | C | D | E | F | G | H |
|---|---|---|---|---|---|---|---|---|
| Paper mould: | | | | | | | | |
| Unit weight (kg./m.³) (DIN 53420) | 24 | 24 | 24 | 28 | 25 | 23 | 25 | 26 |
| Compression strength (kg. wt./cm.²) DIN 53421 | 1.2 | 0.9 | 1.1 | 0.5 | 1.0 | 1.0 | 1.0 | 1.3 |
| Cell size | 1 | 2 | 1 | 4-5 | 2 | 2 | 2 | 2-3 |
| Cell structure | 1 | 2 | 2 | 2 | 2 | 2-3 | 2 | 2 |
| L-shaped mould bulk density (g.) | 350 | 360 | 340 | 340 | 360 | 360 | 360 | 360 |
| Flow height (cm.) | 75 | 67 | 56 | 59 | 81 | 72 | 72 | 48 |
| Average unit weight (kg./m.³) DIN 53420 | 43 | 48 | 45 | 43 | 41 | 39 | 41 | 46 |
| Flow disturbances | None | (1) | (2) | (3) | (4) | (5) | (6) | (7) |
| Overall assessment | 1-2 | 2 | 2 | 5 | 2 | 4 | 5 | 5 |

1 Marginal zone disturbance, cavities.
2 Slight marginal zone disturbance.
3 Severe marginal zone disturbance, cavities, very unsteady cell structure.
4 Slight marginal zone disturbance, slight mixing streaks.
5 Marginal zone disturbance, mixing streaks.
6 Severe marginal zone disturbance, cavities, unsteady cell structure.
7 Primary shrinkage.

TABLE 2

| Foam stabilizer | A | B | C | D | E | F | G | H |
|---|---|---|---|---|---|---|---|---|
| Paper mould: | | | | | | | | |
| Unit weight (kg./m.³) (DIN 53420) | 24 | 26 | 25 | 24 | 26 | 25 | 26 | 24 |
| Compression strength (kg. wt./cm.²) DIN 53421 | 1.2 | 1.4 | 1.5 | 1.2 | 1.5 | 1.5 | 1.3 | 1.3 |
| Cell size | 2-3 | 2 | 3 | 2-3 | 2 | 2-3 | 2 | 3 |
| Cell structure | 2-3 | 2 | 2-3 | 3 | 2 | 2 | 2 | 3 |
| L-shaped mould bulk density (g.) | 347 | 360 | 355 | 350 | 350 | 340 | 345 | 343 |
| Flow height (cm.) | 60 | 48 | 59 | 52 | 46 | 45 | 63 | |
| Average unit weight (kg./m.³) DIN 53420 | 57 | 56 | 50 | 52 | 52 | 49 | 51 | 43 |
| Flow disturbances | (1) | (2) | (3) | (4) | (5) | (6) | (7) | (7) |
| Overall assessment | 2 | 2 | 2-4 | 2-4 | 2 | 2 | 2 | 4 |

1 Slight marginal zone disturbance.
2 Slight marginal zone disturbance, a few small cavities.
3 Marginal zone disturbance, a few cavities.
4 Marginal zone disturbance, unsteady cell structure, cavities.
5 Marginal zone disturbance, unsteady cell structure.
6 Marginal zone disturbance, cavities.
7 Marginal zone disturbance.

TABLE 3

| Foam stabilizer | A | B | C | D | F | G | H |
|---|---|---|---|---|---|---|---|
| Paper mould: | | | | | | | |
| Unit weight (kg./m.³) (DIN 53420) | 23 | 25 | 26 | 25 | 26 | 27 | 24 |
| Compression strength (kg.wt./cm.²) DIN 53421 | 1.1 | 1.4 | 1.7 | 1.3 | 1.4 | 1.5 | 1.4 |
| Cell size | 2 | 1 | 1-2 | 1-2 | 1-2 | 1-2 | 1-2 |
| Cell structure | 2 | 2 | 2 | 2 | 2 | 2 | 1-2 |
| L-shaped mould bulk density (g.) | 358 | 355 | 352 | 345 | 340 | 349 | 340 |
| Flow height (cm.) | 92 | 95 | 82 | 83 | 80 | 70 | 88 |
| Average unit weight (kg./m.³) | 34 | 35 | 39 | 38 | 38 | 40 | |
| Flow disturbances | (1) | (2) | (3) | (4) | (3) | (5) | (6) |
| Overall assessment | 1-2 | 1-2 | 2 | 2 | 2 | 4 | 5 |

1 Only slight marginal zone disturbance.
2 Very slight marginal zone disturbance.
3 Marginal zone disturbance, cavities.
4 Slight marginal zone disturbance, cavities.
5 Marginal zone disturbance, cavities, unsteady cell structure.
6 Primary shrinkage.

TABLE 4

| Foam stabilizer | A | B | C | E | F | G |
|---|---|---|---|---|---|---|
| Paper mould: | | | | | | |
| Unit weight (kg./m.³) DIN 53420 | 23 | 25 | 25 | 23 | 23 | |
| Compression strength (kg. wt./cm.²) DIN 53421 | 1.2 | 1.2 | 1.5 | 1.2 | 1.4 | |
| Cell size | 1-2 | 2 | 2 | 2 | 2-3 | 4 |
| Cell structure | 1-2 | 2 | 2 | 2 | 3 | 4 |
| L-shaped mould bulk density (g.) | 345 | 355 | 360 | 360 | 340 | 340 |
| Flow height (cm.) | 89 | 94 | 69 | 69 | 82 | 72 |
| Average unit weight (kg./m.³) DIN 53420 | 33 | 36 | 43 | 43 | 36 | 42 |
| Flow disturbances | None | None | (1) | (2) | (3) | (4) |
| Overall assessment | 1 | 1 | 2 | 2 | 4 | 5 |

1 Very slight marginal zone disturbance, a few cavities.
2 Slight marginal zone disturbance, some cavities.
3 Marginal zone disturbance, a few cavities.
4 Very severe marginal zone disturbance, cavities, mixing streaks, unsteady cell structure.

TABLE 5

| Foam stabilizer | A | B | C | D | E | F | G | H |
|---|---|---|---|---|---|---|---|---|
| Paper mould: | | | | | | | | |
| Unit weight (kg./m.³) DIN 53420 | 25 | 26 | 27 | 26 | 30 | 27 | 27 | 29 |
| Compression strength (kg. wt./cm.²) DIN 53421 | 1.4 | 1.4 | 1.4 | 1.3 | 1.3 | 1.4 | 1.4 | 1.3 |
| Cell size | 2 | 2 | 1-2 | 2-3 | 2 | 2 | 2-3 | 2-3 |
| Cell structure | 2 | 2 | 2 | 2 | 2 | 2 | 2 | 2 |
| L-shaped mould bulk density (g.) | 355 | 360 | 360 | 353 | 360 | 355 | 341 | 360 |
| Flow height (cm.) | 72 | 74 | 74 | 76 | 73 | 65 | 56 | 79 |
| Average unit weight (kg./m.³) DIN 53420 | 41 | 49 | 44 | 43 | 44 | 47 | 44 | 42 |
| Flow disturbances | (1) | (2) | (3) | (4) | (5) | (6) | (7) | (4) |
| Overall assessment | 2 | 1 | 2 | 4 | 2 | 4 | 5 | 4 |

1 Marginal zone disturbance, small cavities.
2 Very slight marginal zone disturbance, a few small cavities.
3 Marginal zone disturbance, a few cavities.
4 Slight marginal zone disturbance cavities.
5 Slight marginal zone disturbance, slight mixing streaks.
6 Marginal zone disturbance.
7 Severe marginal zone disturbance, a few cavities, unsteady cell sturcuture.

TABLE 6

| Foam stabilizer | A | C | E | F | G |
|---|---|---|---|---|---|
| Paper mould: | | | | | |
| Unit weight (kg./m.³) DIN 53420 | 23 | 26 | 26 | 27 | 27 |
| Compression strength (kg. wt./cm.²) DIN 53421 | 1.1 | 1.3 | 1.1 | 1.2 | 1.2 |
| Cell size | 2 | 2-3 | 2-3 | 3 | 3 |
| Cell structure | 2-3 | 3 | 2-3 | 4 | 3 |
| L-shaped mould bulk density (g.) | 346 | 340 | 340 | 340 | 350 |
| Flow height (cm.) | 84 | 53 | 58 | 50 | 50 |
| Average unit weight (kg./m.³) DIN 53420 | 35 | 46 | 44 | 51 | 53 |
| Flow disturbances | (1) | (2) | (3) | (3) | (3) |
| Overall assessment | 2 | 4 | 4 | 5 | 5 |

1 Very slight marginal zone disturbance, small cavities.
2 Slight marginal zone disturbance.
3 Marginal zone disturbance, cavities.

TABLE 7

| | Foam stabilizer | | | | | | | | | |
|---|---|---|---|---|---|---|---|---|---|---|
| | A | | | | | C | | | E | | |
| Storage time (days) at 80° C | 0 | 7 | 10 | 12 | 14 | 0 | 7 | 14 | 0 | 7 | 14 |
| Unit weight (kg./m.³) (DIN 53420) | 22 | 22 | 21 | 22 | 22 | 24 | 26 | 28 | 23 | 26 | 29 |
| Setting time (sec.) | 64 | 62 | 66 | 67 | 67 | 61 | 82 | 82 | 63 | 78 | 86 |
| Cell size | 1 | 1 | 1-2 | 1 | 1 | 1 | 2-3 | 2-3 | 1-2 | 2 | 3 |
| Cell structure | 1 | 1 | 1-2 | 1-2 | 1-2 | 1 | 2-3 | 2-3 | 1 | 2 | 1 |

TABLE 8

| | Foam stabilizer | | | | | | | | | | | | |
|---|---|---|---|---|---|---|---|---|---|---|---|---|---|
| | A | | | | | C | | | | | D | | |
| Storage time (months) | 0 | 1 | 2 | 3 | 6 | 0 | 1 | 2 | 3 | 6 | 0 | 1 | 2 |
| Unit weight (kg./m.³) DIN 53420 | 24 | 23 | 24 | 23 | 23 | 24 | 24 | 23 | 24 | 24 | 25 | 24 | |
| Setting time (sec.) | 100 | 104 | 105 | 107 | 106 | 98 | 100 | 100 | 110 | 115 | 110 | 115 | Collapse of foam. |
| Cell size | 1 | 1-2 | 1 | 2 | 1-2 | 1 | 1-2 | 1-2 | 2 | 2 | 2-3 | 3 | |
| Cell structure | 1 | 1-2 | 1 | 1-2 | 1-2 | 1 | 1-2 | 1-2 | 2 | 2 | 2-3 | 3 | |

What is claimed is:

1. In the process of producing polyurethane foam resins from polyhydroxyl compounds, polyisocyanates, blowing agents, foam stabilizers and other conventional additives, the improvement comprising the use of a siloxane modified carbamic acid derivative foam stabilizer having at least one structural unit of the formula

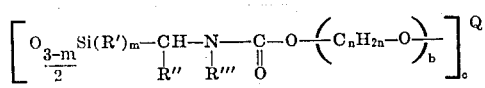

and other structural units of the formula

but in which at least one in a thousand structural units corresponds to the first mentioned formula, and R' represents an optionally halogenated or cyano-substituted $C_1$ to $C_{10}$ alkyl, $C_4$ to $C_{10}$ cycloalkyl or $C_6$ to $C_{10}$ aryl radical, R'' represents a hydrogen atom or a methyl or phenyl radical, R''' represents a $C_1$ to $C_{10}$ alkyl, $C_4$ to $C_{10}$ cycloalkyl, $C_2$ to $C_{10}$ alkenyl, $C_7$ to $C_{10}$ aralkyl, di-($C_1$ — $C_{10}$ alkyl)-amino-$C_1$—$C_{10}$ alkyl, $C_6$ to $C_{10}$ aryl or $C_7$ to $C_{10}$ alkaryl radical, Q represents a monovalent to hexavalent saturated $C_1$ to $C_6$ alkyl radical, or a monovalent to trivalent $C_6$ aryl radical, $m = 0$, 1 or 2, $n = 2$, 3 or 4, $a = 0$, 1, 2 or 3, $b$ represents an integral of 1 to 200, and $c$ represents the valency of Q, the radicals and numerical values at each position of a molecule being chosen independently of the others.

2. The process of claim 1 wherein the foam stabilizer is present in a quantity of from 0.05 per cent to 5 per cent by weight based on the weight of polyhydroxyl compound.

3. The process of claim 1 wherein the foam stabilizer is

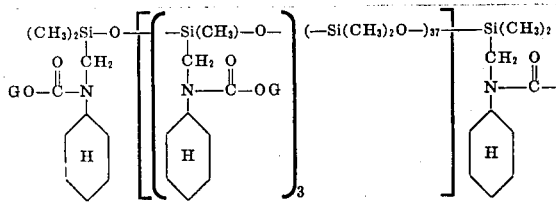

wherein —OG represents the radical

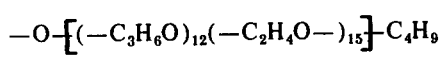

of a block polyether.

4. The process of claim 1 wherein the foam stabilizer is

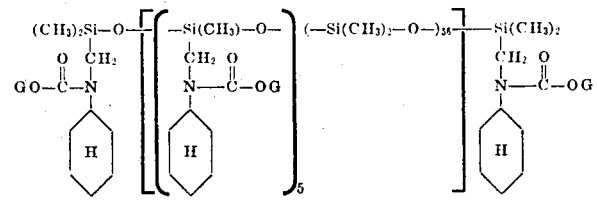

wherein —OG represents the radical

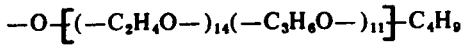

of a mixed polyether.

5. The process of claim 1 wherein the foam stabilizer is

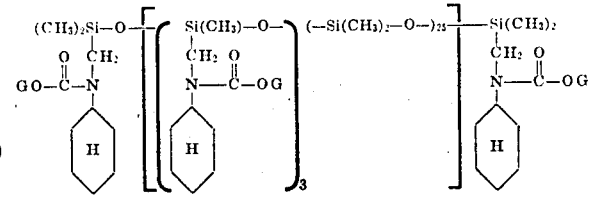

wherein —OG represents the radical

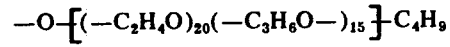

of a block polyether.

6. The process of claim 1 wherein the foam stabilizer is

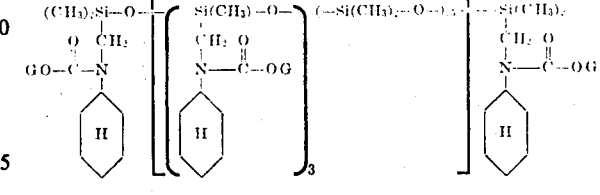

wherein —OG represents the radical

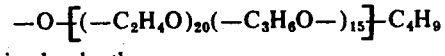

of a mixed polyether.

7. The process of claim 1 wherein the foam stabilizer is

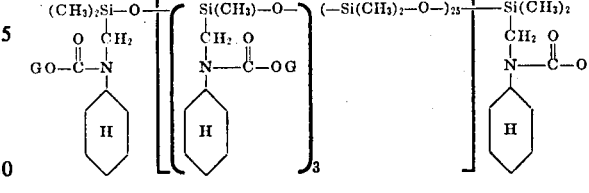

wherein —OG represents the radical

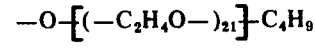

of a polyether.

8. The process of claim 1 wherein the foam stabilizer is

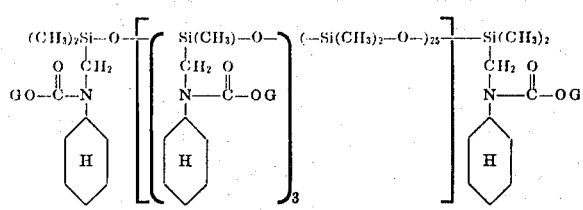
wherein —OG represents the radical
$$-O-[(-C_2H_4O-)_{34}]-C_4H_9$$
of a polyether.
9. The process of claim 1 wherein the foam stabilizer is
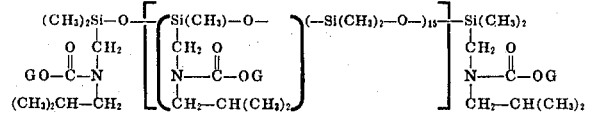
wherein —OG represents the radical
$$-O-[(-C_2H_4O-)_{18}(-C_3H_6O-)_{14}]-C_4H_9$$
of a polyether.
* * * * *